US008682339B2

(12) United States Patent
Xu et al.

(10) Patent No.: US 8,682,339 B2
(45) Date of Patent: Mar. 25, 2014

(54) METHOD AND APPARATUS FOR SENDING AND RECEIVING BROADCAST SERVICE IN A DIGITAL BROADCASTING SYSTEM

(75) Inventors: Yiling Xu, Suwon-si (KR); Jae-Yeon Song, Seoul (KR); Kook-Heui Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 773 days.

(21) Appl. No.: 12/475,007

(22) Filed: May 29, 2009

(65) Prior Publication Data
US 2009/0300690 A1  Dec. 3, 2009

(30) Foreign Application Priority Data

May 29, 2008 (KR) .................. 10-2008-0050521

(51) Int. Cl.
*H04H 20/42* (2008.01)
(52) U.S. Cl.
USPC ............ 455/454; 455/3.06; 455/39; 709/217; 725/62; 375/240.12
(58) Field of Classification Search
USPC .......... 455/436, 437, 432.1, 344, 556.1, 416, 455/428, 424, 425, 454, 186.1, 381; 370/328, 331, 338, 390, 312; 725/54, 725/62, 118, 105, 51, 63, 131, 135, 93; 709/231, 218, 232, 217; 348/14.01
See application file for complete search history.

(56) References Cited

U.S. PATENT DOCUMENTS

| 7,827,579 | B2 * | 11/2010 | Saarikivi et al. | 725/59 |
| 8,087,058 | B2 * | 12/2011 | Cohen | 725/116 |
| 8,510,774 | B2 * | 8/2013 | Lee et al. | 725/37 |
| 2005/0273833 | A1 * | 12/2005 | Soinio | 725/113 |
| 2006/0262751 | A1 * | 11/2006 | Vermola et al. | 370/331 |
| 2006/0262793 | A1 * | 11/2006 | Vare et al. | 370/390 |
| 2007/0180467 | A1 * | 8/2007 | Lee et al. | 725/39 |
| 2008/0040761 | A1 | 2/2008 | Xu et al. | |
| 2008/0046926 | A1 | 2/2008 | Jeon et al. | |
| 2008/0127291 | A1 | 5/2008 | Xu et al. | |
| 2008/0130530 | A1 * | 6/2008 | Gabay | 370/310 |

FOREIGN PATENT DOCUMENTS

| EP | 1 871 027 | 12/2007 |
| KR | 1020070056479 | 6/2007 |
| KR | 1020070096796 | 10/2007 |
| KR | 100800858 | 1/2008 |
| KR | 1020080041981 | 5/2008 |
| WO | WO 2006/123216 | 11/2006 |

OTHER PUBLICATIONS

Digital Video Broadcasting (DVB); DVB-H Implementation Guidelines, ETSI TR 102 377 V1.2.1, European Broadcasting Union, Nov. 2005.

DVB Organization: "Service Continuity with Roaming", TM-CBMS 1630, Digital Video Broadcasting, May 18, 2006.

* cited by examiner

*Primary Examiner* — Mahendra Patel
(74) *Attorney, Agent, or Firm* — The Farrell Law Firm, P.C.

(57) ABSTRACT

A method and apparatus for sending a broadcast service in a digital broadcasting system. The method includes assigning a same Internet Protocol (IP) address for a common broadcast service when the common broadcast service is provided in at least two IP platforms, each of the at least two IP platforms providing a broadcast service to a terminal; delivering the common broadcast service using the same IP address; and delivering related information relevant to the common broadcast service.

14 Claims, 12 Drawing Sheets

Platform id

Platform id:(0x)

METHOD AND APPARATUS FOR SENDING AND RECEIVING BROADCAST SERVICE IN A DIGITAL BROADCASTING SYSTEM

PRIORITY

This application claims priority under 35 U.S.C. §119(a) to a Korean Patent Application filed in the Korean Intellectual Property Office on May 29, 2008 and assigned Serial No. 10-2008-0050521, the contents of which are incorporated herein by reference.

BACKGROUND OF THE INVENTION

1. Field of the Invention

The present invention relates to a method and apparatus for providing a broadcast service to a terminal while maintaining service continuity in a digital broadcasting system.

2. Description of the Related Art

A Digital Video Broadcasting-Handheld (DVB-H) Convergence of Broadcasting and Mobile Service (CBMS) system, which is a type of digital broadcasting system, provides more convenient functions by combining digital TV broadcast services, which have excellent mobile reception performance, with other mobile communication services.

Currently, people can enjoy High Definition TV (HDTV)-class image quality and CD-class audio quality in their homes. However, there is an increasing demand to enjoy TV services of high image quality even while traveling.

DVB-H CBMS, which is a system made for mobile receiving terminals capable of using mobile communication channels, includes a concept of a handover supported in cell-based wireless communications like in a conventional mobile communication system. However, a handover in broadcast networks is distinct from a handover in mobile communication networks that always manage subscribers. More specifically, in mobile communication systems, the network manages individual users, and receives Measurement Reports from the terminals for network management, including a handover. However, in general broadcasting systems, broadcast service providers provide services and contents, but do not manage all of individual users. That is, the service providers send the information for broadcast reception to all users over the broadcast network, but have no user management function. Therefore, the handover in broadcast networks has a specific technical requirement that is distinguishable from that of the handover in mobile communication systems.

FIG. 1 illustrates an architectural model of CBMS, or architecture of a general DVB-H system. Internet Protocol (IP) Datacast over DVB-H involves a collection of entities that work together in order to achieve the required capabilities.

The entities illustrated in FIG. 1 are logical entities, which can be either physically separated or combined into various units, and the logical entities may be merged into one or more physical entities. For convenience purpose, only the interfaces directly associated with the main features of the present invention are illustrated herein.

The system illustrated in FIG. 1 is for Digital Video Broadcasting-Convergence of Broadcasting and Mobile Service (DVB-CBMS), which is one of the mobile broadcast terminal standard organizations. Although the following description will be given in connection with, for example, a notification broadcasting mechanism of DVB-CBMS, a similar operation would also be available in other mobile broadcasting systems with a notification messaging function.

Referring to FIG. 1, a Content Creation (CC) 110 provides broadcast services, which may include a conventional audio/video broadcast service, file (music file or data file) download service, etc. The Content Creation 110, when there is a problem or change in provision of broadcast services, notifies the change to a notification event generator (not shown) in a Service Application (SA) 120.

The Service Application 120 is provided with content data for broadcast services from the Content Creation 110, and generates broadcast service data by processing the content data in a form appropriate for a broadcast network (e.g., in a form of streaming audio/video, movie download, etc.). Further, the Service Application 120 creates standardized metadata needed for an Electronic Service Guide (ESG), and creates accounting information for users. Also, the Service Application 120 receives a notification on the change in broadcast services from the Content Creation 110, delivers a notification event to a notification message generator located in a Service Management (SM) 130, and provides service guide attribute information used for creation of a notification message to the notification message generator.

The Service Management 130 determines a transmission schedule of the broadcast services provided from the Service Application 120, and generates a service guide. The Service Management 130 is connected to a Broadcast Network 140 capable of providing broadcast services, and an Interactive Network 150 capable of supporting interactive communication.

The Service Management 130 manages subscription information for a subscriber(s) intending to receive a broadcast service, service provision information such as information about whether the subscriber has purchased relevant contents, and device information for the terminals that will receive the broadcast service. The Service Management 130 delivers user accounting information to the Service Application 120, and provides the subscription information, the service provision information, the device information, etc., to the Broadcast Network 140 and the Interactive Network 150.

The Broadcast Network 140 is a network that delivers broadcast services. In this specification, DVB-H will be given as an example of the network.

The Interactive Network 150 delivers broadcast services on a one-to-one basis, or exchanges control information related to receipt of broadcast services and additional information in an interactive way, and can be embodied by an existing cellular network such as, for example, a 3GPP Wideband Code Division Multiple Access (WCDMA) network.

A Terminal 160 receives broadcast services, and can connect with a cellular network according to its capability. In the present application, a terminal capable of accessing the cellular network will be considered.

CBMS-x is an interface in the scope of the IP Datacast standard over DVB-H, and X-x is an interface out of the scope of the IP Datacast standard over DVB-H. More specifically, a CBMS-7 interface is an interface from the Service Application 120 to the Service Management 130, and a CBMS-3 interface is used when a message is directly delivered from the Service Management 130 to the Terminal 160 over the Broadcast Network 140. A CBMS-4 interface is used when a message delivered from the Service Management 130 is directly delivered to the Terminal 160 through a dedicated channel to the Terminal 160 over the Interactive Network 150, or through a broadcast channel provided by the Interactive Network 150. A CBMS-6 interface is an interface between the Service Management 130 and the Broadcast Network 140, which is used to establish a transmission path that the Service Management 130 will use in the Broadcast Network 140, or is used as a reception path for event information generated in the Broadcast Network 140. A CBMS-1 interface carries control information of the broadcast network to the Terminal 160, and a control signal channel, called Program Specific Information/Service Information (PSI/SI), corresponds to this interface in DVB-H.

An X-3 interface is used to establish a transmission path to be used between the Service Management 130 and the Interactive Network 150. An X-2 interface is used to establish a transmission path to be used between the Terminal 160 and the Interactive Network 150. An X-1 interface is used to establish a transmission path to be used between the Content Creation 110 and the Service Application 120.

If a user belonging to a DVB-H network has traveled from an existing network to a neighboring network, or has moved from a current IP platform to another IP platform, the ongoing service should be provided to the user seamlessly in the network or IP platform to which the user has moved. A terminal should find the program the user was viewing before the handover, from the network to which the user has moved, in order for the terminal to continuously receive the service. That is, when a transport stream is changed, the terminal should find a transport stream in which the same service is provided, in the network or IP platform to which the user has moved, and when a transmission frequency is changed, the terminal should detect frequency information of the neighboring network or IP platform. Information necessary for the above process may be acquired from PSI/SI provided by a DVB broadcast network. In this case, because the handover procedure and method departs from the scope of the present invention, a detailed description thereof is not provided. For more details, reference can be made to ETSI TR 101 211 Digital Video Broadcasting (DVB); Guidelines on implementation and usage of Service Information (SI).

In the above-described process, a service identifier may play an important role in finding the program the user is viewing. The steps the terminal takes to receive the program even after the handover may also be applied in the same way if the user makes inter-cell movement and inter-subcell movement. In addition, when the network or IP platform to which the user has moved does not support the service the user was viewing before, the terminal checks if there is any alternative service available in that network or IP platform. Here, "alternative service" refers to, for example, a new service that is different in program organization in each region, but of the same genre.

The above-described IP platform, which is a set of IP flows managed by the service providers, represents a harmonized IP address space that has no address collisions. An IP platform may span several transport streams within one or more networks. Several IP platforms may co-exist in the same transport stream. An IP platform is identified by platform identification (id).

Platform id values are divided into two ranges. One range includes platform id values that are globally unique. Another range includes platform id values unique only within the scope of a DVB network. Such an IP platform id is globally and uniquely identified by only combination of both a platform id and a network id. In the specification, for ease of description, the first case that global unique platform id is to be used as an example.

In the current network, each IP platform is independent. The IP flows from different IP platforms are also independent, and their IP addresses have no interrelationship. For example, two IP flows in different IP platforms have the same IP address, but they may be different IP flows because two IP platforms are totally independent.

As described above, there is a problem about service continuity in a digital broadcasting system such as DVB-H CBMS. When the same broadcast service exists in the different IP platforms, the terminal cannot recognize it is the same broadcast service because its IP address in different IP platforms is independent. Therefore, when the terminal changes reception of the broadcast service from a first IP platform to a second IP platform, it cannot continue to receive the broadcast service even though the same broadcast service exits in both of the first and second IP platforms.

SUMMARY OF THE INVENTION

Accordingly, the present invention is designed to address at least the above-mentioned problems and/or disadvantages and to provide at least the advantages described below. An aspect of the present invention provides a method and apparatus for sending and receiving a broadcast service in a digital broadcasting system.

Another aspect of the present invention provides a method and apparatus for sending and receiving a broadcast service while maintaining service continuity in a digital broadcasting system.

In accordance with an aspect of the present invention, there is provided a method for sending a broadcast service in a digital broadcasting system. The method includes assigning a same Internet Protocol (IP) address for a common broadcast service when the common broadcast service is provided in common in at least two IP platforms each providing a broadcast service to a terminal; delivering the common broadcast service using the same IP address; and delivering related information relevant to the common broadcast service.

In accordance with another aspect of the present invention, there is provided a method for receiving a broadcast service in a digital broadcasting system. The method includes receiving related information relevant to a common broadcast service being provided in common in at least two Internet Protocol (IP) platforms, from one of the at least two IP platforms; and determining whether a currently received broadcast service is the common broadcast service, based on the related information, and continuously receiving the common broadcast service from a remaining IP platform except for the one IP platform when the currently received broadcast service is the common broadcast service.

In accordance with another aspect of the present invention, there is provided an apparatus for sending a broadcast service in a digital broadcasting system. The apparatus includes a cooperating Internet Protocol (IP) platform handler for assigning a same IP address for a common broadcast service when the common broadcast service is provided in common in at least two IP platforms each providing a broadcast service to a terminal, and generating related information relevant to the common broadcast service; a related information transmitter for transmitting the related information received from the cooperating IP platform handler to the terminal; and the at least two IP platforms for delivering the common broadcast service to the terminal using the same IP address.

In accordance with another aspect of the present invention, there is provided an apparatus for receiving a broadcast service in a digital broadcasting system. The apparatus includes a reception unit for receiving related information relevant to a common broadcast service being provided in common in at least two Internet Protocol (IP) platforms, from one of the at least two IP platforms; and a mobility management block for determining whether a currently received broadcast service is the common broadcast service, based on the related information, and controlling the reception unit to continuously receive the common broadcast service from a remaining IP platform except for the one IP platform when the currently received broadcast service is the common broadcast service.

BRIEF DESCRIPTION OF THE DRAWINGS

The above and other aspects, features, and advantages of the described embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS THE PRESENT INVENTION

Hereinafter, embodiments of the present invention will be described in detail with reference to the accompanying drawings. In the following description and drawings, a detailed description of known functions and configurations incorporated herein will be omitted when it may obscure the present invention in non-essential details.

The terms and words used in the following description and claims are not limited to the bibliographical meanings, but are merely used by the inventor to enable a clear and consistent understanding of the invention. Accordingly, it should be apparent to those skilled in the art that the following description of the embodiments of the present invention are provided for illustration purpose only and not for the purpose of limiting the invention as defined by the appended claims and their equivalents.

In the following description, different IP platforms may provide the same broadcast service, and each of the different IP platforms that cooperate with each other to provide the same broadcast service will be referred to as a "cooperating IP platform." Herein, the same IP address is assigned to the same broadcast service in all cooperating IP platforms. Accordingly, if the terminal finds the same IP address in different IP platforms, that the terminal can identify that the same service exists in different IP platforms. Consequently, the terminal can continue to receive the broadcast service even when it changes the reception from one IP platform to another.

In embodiments of the present invention described hereinbelow, different IP platforms cooperate with each other to assign the same IP address range for the same broadcast services, and a mobile terminal may find the same broadcast service from the different cooperating IP platforms to continuously receive the broadcast service. For example, if an IP platform A also provides a broadcast service A while an IP platform B provides the broadcast service A, and the broadcast service A provided in the IP platform A and the broadcast service A provided in the IP platform B have the same IP address, then the IP platforms A and B will become cooperating IP platforms. That is, when the IP platform A is presently receiving the broadcast service A, the IP platform B becomes a cooperating IP platform for the IP platform A, and vice versa.

To support the cooperating IP platforms, the following mechanism may be proposed.

1. Indicating if IP Platforms Share a Common IP Address Range

The sharing (or cooperating) relationship between IP platforms should be indicated.

To indicate the relationship between IP platforms, the cooperating platform identifier (id) may be assigned to these cooperating IP platforms.

Figure 1:
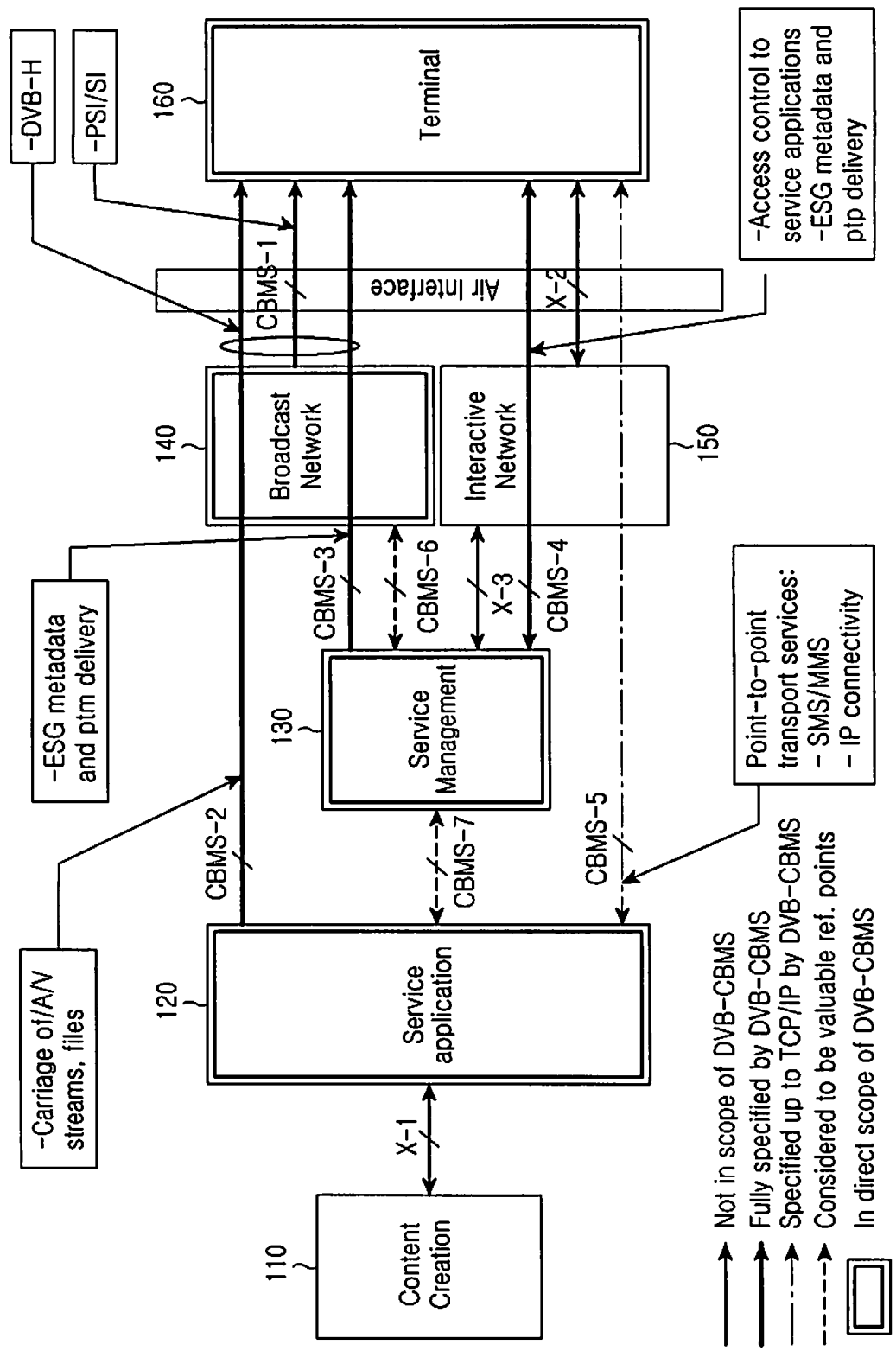
FIG. 1 illustrates an architectural model of CBMS, or architecture of a general DVB-H system.
Figure 2:
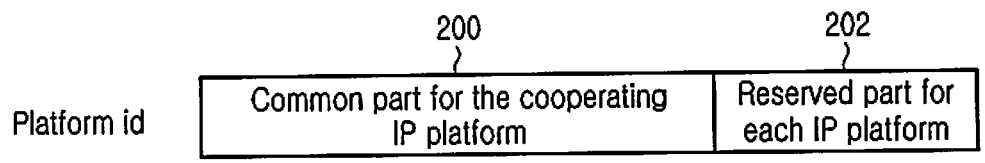
FIG. 2 illustrates a platform id according to an embodiment of the present invention.

FIG. 2 illustrates a platform id according to an embodiment of the present invention. Referring to FIG. 2, a platform id length is divided into two parts as. In the platform id, a first part 200 is a part where all IP platforms have the common value when an IP platform shares an IP address range with other IP platforms, and a second part 202 is a reserved part used to identify each IP platform.

A partial range of an IP address of each IP platform is set as a common IP address range for the services that respective IP platforms provide in common, so the terminal may check if the respective IP platforms have the common IP address range, and then determine if the same broadcast service is provided in common in different IP platforms.

Figure 3:
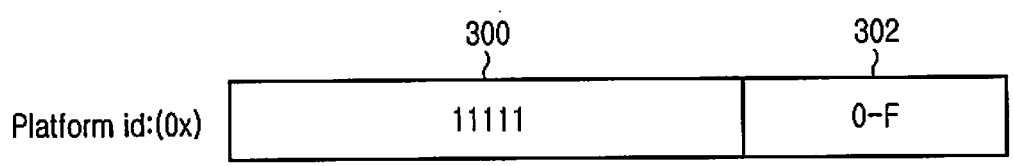
FIG. 3 illustrates a structure of a platform id when a plurality of IP platforms exists and the IP platforms are cooperating IP platforms, according to an embodiment of the present invention.

FIG. 3 illustrates a structure of a platform id when a plurality of IP platforms (IP platform 1 and IP platform 2) exist and the IP platforms are cooperating IP platforms, according to an embodiment of the present invention.

A Platform id in FIG. 3 has a common part, or '11111', as indicated by reference numeral 300. Here, '11111' is set as a common value because the IP platform 1 and the IP platform 2 are cooperating IP platforms that can both provide the same broadcast service. Reference numeral 302 indicates bits used to identify the respective IP platforms.

The accurate numbers of bits in the parts 300 and 302 are not defined in the present invention.

Alternatively, the cooperating relationship could also be signaled to the terminal through notification, ESG, PSI/SI or provisioning, or any other signaling.

Table 1 below shows parameters for signaling of cooperating IP platforms according to an embodiment of the present invention. For example, these parameters can be signaled to the terminal through notification, ESG, PSI/SI or provisioning, or any other signaling.

TABLE 1

| Field | Semantics |
| --- | --- |
| signaling about cooperating IP platform identifier | Specifies in Boolean value whether this IP platform has an IP address range in common with other IP platforms. |
| No_IPPlatform | Specifies a number assigned to the cooperating IP platform |
| Platform id | Specifies the identifier of the cooperating IP platform |

Reference numerals 200 and 300 indicate No_IPPlatform in Table 1, and reference numerals 202 and 302 indicate Platform id in Table 1.

The parameters described in Table 1 may be used flexibly. For example, in the PSI/SI, there is one element about a platform provider name. For one group of cooperating IP platforms, this information may be indicated inside the platform provider name. Here, "one group of cooperating IP platforms" means a bundle of cooperating IP platforms, which are IP platforms that assign the same broadcast service to the same IP address.

Reference numeral 200 in FIG. 2 indicates No_IPPlatform in Table 1. The No_IPPlatform indicates one group of cooperating IP platforms. If IP platforms in one group are cooperating IP platforms, all IP platforms in this group will have the same No_IPPlatform as indicated by reference numeral 200. FIG. 3 illustrates an example of one group of cooperating IP platforms. In this example, all IP platforms in this one group have 0x11111 as No_IPPlatform as indicated by reference numeral 300.

Reference numeral 202 in FIG. 2 is used to identify each IP platform in the one group, or the bundle of cooperating IP platforms. Regarding reference numeral 302 in FIG. 3, it can be noted that 16 IP platforms (0~F) may exist in one group of cooperating IP platforms. "0x11111" indicated by reference numeral 300 is used to distinguish this cooperating IP platform group from another cooperating IP platform group, and each IP platform in the cooperating IP platform group has a common part indicated by reference numeral 300. In this way, reference numeral 300 shows that the 16 IP platforms included in the cooperating IP platform group have the same No_IPPlatform, meaning that the 16 IP platforms belong to the same group of cooperating IP platforms. A value of reference numeral 302 is used to identify each IP platform included in the cooperating IP platform group.

2. IP Address for the Same Service in Cooperating IP Platforms

The IP addresses used in the cooperating IP platforms may be divided into different ranges: one range corresponding to the same broadcast service as that provided in common in different IP platforms in the cooperating IP platform group, and another range corresponding to different broadcast services provided in different IP platforms.

Figure 4:
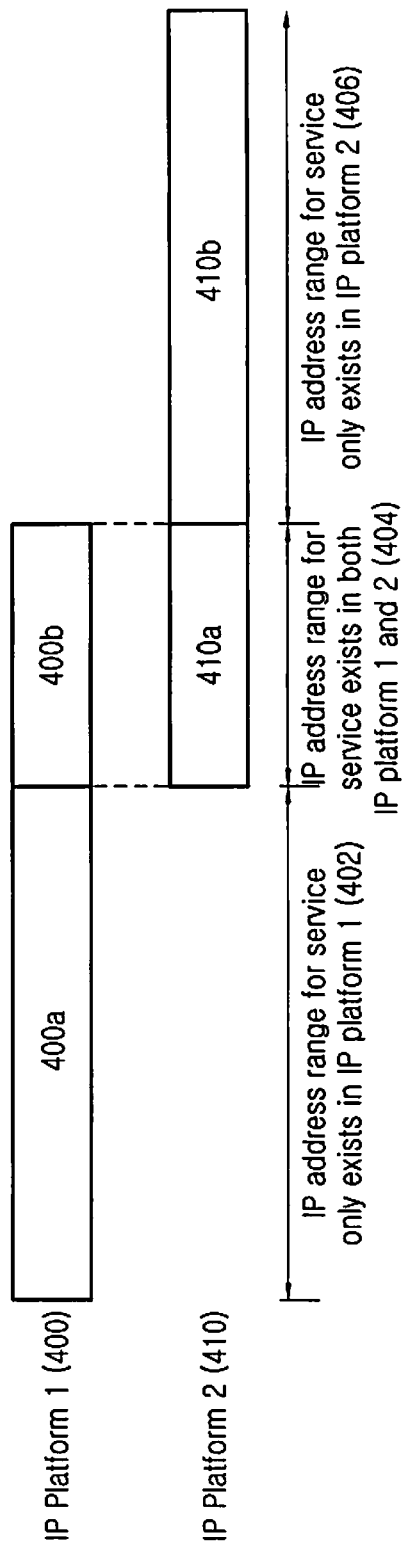
FIG. 4 illustrates an IP address range for broadcast services when two cooperating IP platforms exist, according to an embodiment of the present invention.

FIG. 4 illustrates an IP address range for broadcast services when two cooperating IP platforms (IP platform 1 and IP platform 2) exist, according to an embodiment of the present invention. Referring to FIG. 4, the IP address range, when two cooperating IP platforms (IP platform 1 and IP platform 2) exist, can be divided into an IP address range for the broadcast services existing only in the IP platform 1 out of the cooperating IP platforms, an IP address range for the broadcast services existing in both the IP platform 1 and the IP platform 2, and an IP address range for the broadcast services existing only in the IP platform 2.

Reference numeral 400 indicates an IP address range for the broadcast services provided in the IP platform 1, and reference numeral 410 indicates an IP address range for the broadcast services provided in the IP platform 2. The term "IP address range" as used herein means an IP address range in which IP addresses for the broadcast services are included. For example, when an IP address of a specific broadcast service is 198.122.12.1, IP addresses of the broadcast service, ranging from 198.122.12.1 to 198.122.12.16, can be considered as the IP address range. That is, the same IP address is assigned to the broadcast services provided in common in the IP platform 1 and the IP platform 2 which are cooperating IP platforms, and the same IP address range will be assigned to at least two broadcast services provided in common in the cooperating IP platforms.

As illustrated in FIG. 4, two cooperating IP platforms are considered by way of example. The IP address used in these two IP platforms is divided into three ranges. A first range 402 is used for the broadcast service that exits only in the IP platform 1, a third range 406 is used for the broadcast service that exits only in IP platform 2, and a second range 404 (an overlapping range in both IP platforms) is used for the common broadcast service that exits in both the IP platform 1 and the IP platform 2. That is, reference numeral 400a indicates an IP address range for the broadcast services existing only in the IP platform 1, reference numeral 410b indicates an IP address range for the broadcast services existing only in the IP platform 2, and reference numerals 400b and 410a indicate IP address ranges for the broadcast services existing in common in both the IP platform 1 and the IP platform 2. Based on the example of FIG. 4, if the terminal detects the same IP address in the both IP platforms, it is able to identify that the same service is found in these two IP platforms.

As another example, two cooperating IP platforms have the same IP address range.

Figure 5:
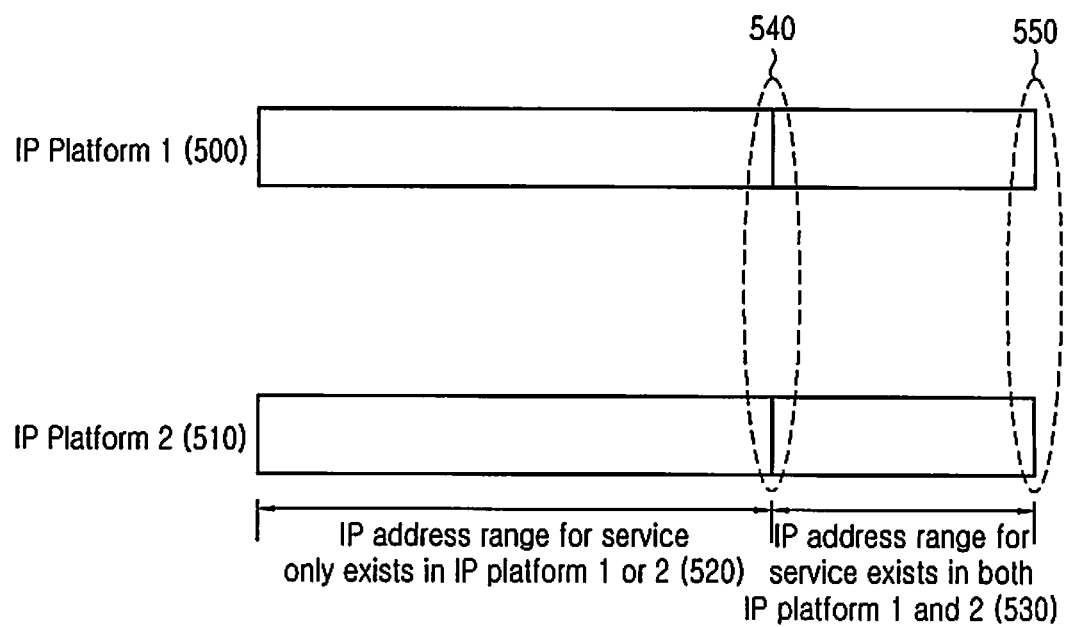
FIG. 5 illustrates an IP address range for broadcast services when two cooperating IP platforms have the same IP address range, according to an embodiment of the present invention.

FIG. 5 illustrates an IP address range for broadcast services when two cooperating IP platforms have the same IP address range, according to an embodiment of the present invention.

Referring to FIG. 5, the IP address range, when two cooperating IP platforms have the same IP address range, can be divided into an IP address range for the broadcast services existing only in the IP platform 1 or the IP platform 2 out of the cooperating IP platforms, and an IP address range for the broadcast services existing in both the IP platform 1 and the IP platform 2.

The common IP address range for the common broadcast services provided in both cooperating IP platforms is reserved, and others are IP address ranges for the non-common broadcast services. In this case, which range is used for common broadcast services in all cooperating IP platforms should be provisioned or signaled to the terminal. In this embodiment, with the information in Table 2, the terminal can identify whether the service is the same service or different one when it detects the same IP address in different IP platforms.

FIG. 5 illustrates an IP address range for the broadcast services existing only in the IP platform 1 or the IP platform 2, and an IP address range for the broadcast services existing in both the IP platform 1 and the IP platform 2 in accordance with an embodiment of the present invention. More specifically, reference numeral 500 in FIG. 5 indicates an IP address range of the IP platform 1, and reference numeral 510 indicates an IP address range of the IP platform 2. Reference numeral 520 indicates an IP address range for the broadcast services existing only in the IP platform 1 or the IP platform 2, and reference numeral 530 indicates an IP address range for the broadcast services existing in both the IP platform 1 and the IP platform 2.

Parameters about the IP address range for the common broadcast services in cooperating IP platforms as illustrated in FIG. 5 are shown in Table 2. The information in Table 2 may be signaled using notification, ESG, PSI/SI, independent signaling, provisioning, etc.

TABLE 2

| Field | Semantics |
| --- | --- |
| Signaling about IP address range for the common broadcast service exiting in the cooperating IP platform | Specifies that this signaling is for indicating the IP address range for the common broadcast service exiting in the cooperating IP platform |
| Start_IPAddress | Specifies the start IP address of the range for the common broadcast service in the cooperating IP platform |
| End_IPAddress | Specifies the end IP address of the range for the common broadcast service in the cooperating IP platform |

Referring to FIG. 5, because reference numeral 540 indicates a start part of an IP address corresponding to the common broadcast services in the IP platform 1 and the IP platform 2 which are cooperating IP platforms, reference numeral 540 becomes the start IP address Start_IPAddress in Table 2. Similarly, because reference numeral 550 indicates an end part of the IP address corresponding to the common broadcast services in the IP platform 1 and the IP platform 2, reference numeral 550 becomes the end IP address End_IPAddress in Table 2. When the number of the common IP address ranges is plural, the number of sets of Start_IPAddress and End_IPAddress could also be plural.

3. Cooperating ESG Mechanism

Figure 6:
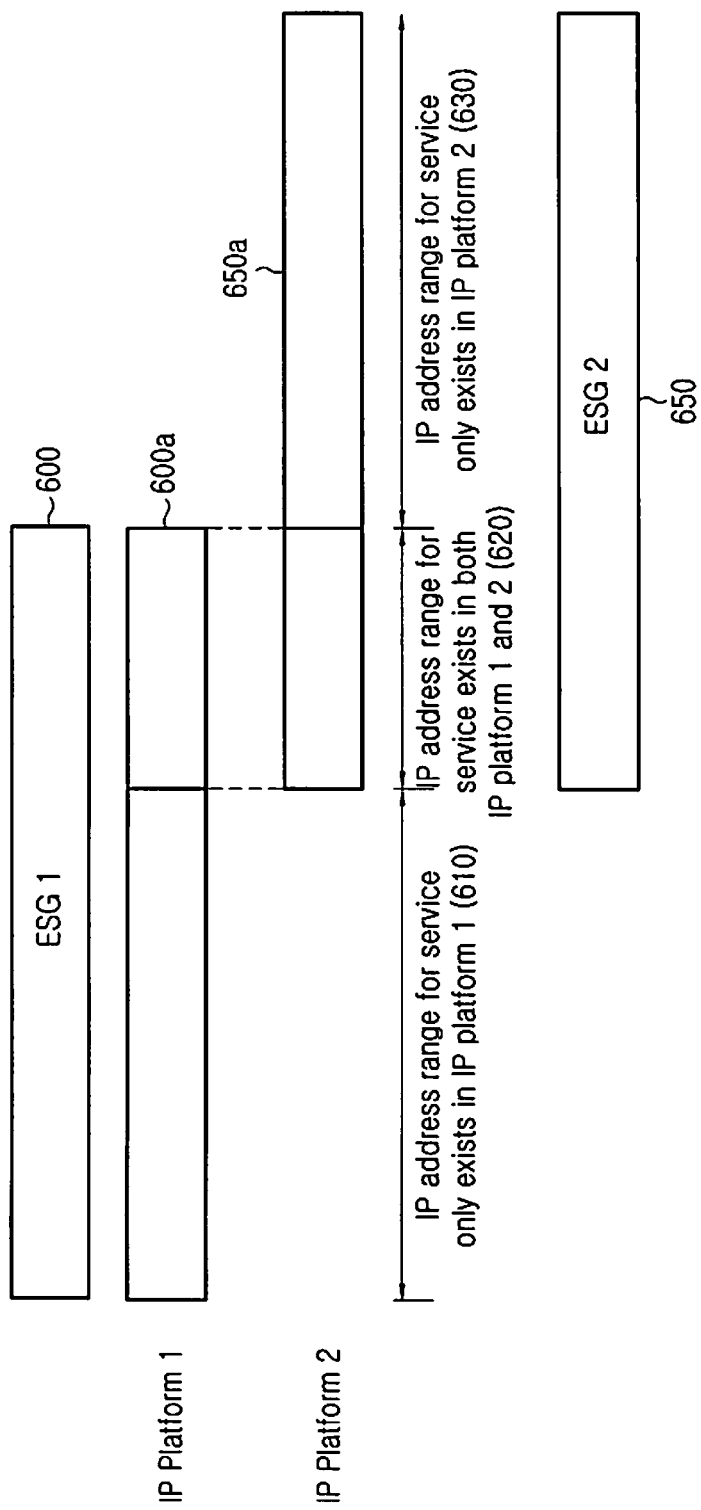
FIG. 6 illustrates an IP address range for ESG services when different ESGs are provided in cooperating IP platforms according to further an embodiment of the present invention.

Based on the current ESG specification, ESGs in different IP platforms should be different. FIG. 6 illustrates an example in which IP platforms have different ESGs. For example, an ESG1 600 is provided in the IP platform 1, and an ESG2 650 is provided in the IP platform 2. This example is based on the first cooperating IP platforms as described above, although a similar example could also be based on of the second cooperating IP platforms as described above.

The same broadcast services provided in these two IP platforms have the same IP address range. However, the information related to the same broadcast service, e.g., schedule, purchase, and acquisition, may be either same or different for the respective IP platforms. Accordingly, the related fragments in ESG1 and ESG2 for the same services may also be the same or different.

Reference numeral 600*a* in FIG. 6 indicates an IP address range for the broadcast services provided by the ESG1 600 provided in the IP platform 1, and reference numeral 650*a* indicates an IP address range for the broadcast services provided by the ESG2 650 provided in the IP platform 2. Reference numeral 610 indicates an IP address range for the broadcast services provided by an ESG provided only in the IP platform 1, reference numeral 620 indicates an IP address range for the broadcast services provided by ESGs provided in common in both the IP platform 1 and the IP platform 2, and reference numeral 630 indicates an IP address range for the broadcast services provided by an ESG provided only in the IP platform 2.

3.1 Signaling of Common Service in ESG

To indicate which service in the ESG is the common service provided in the cooperating IP platforms, a new element may exist in a service fragment (or in any other location) as shown in Table 3. The service fragment is a field existing in the ESG. That is, the ESG includes a set of data structures, including a service fragment containing overall information such as an id of the service provided, a content fragment containing attribute information such as a codec for the content or video and audio constituting each service, a schedule event fragment indicating the time the service is to be provided, an access fragment providing a location of the server where the service can be accessed, a service purchase fragment, and a purchase channel fragment. Therefore, 'CommonServiceInCooperationIPPlatform' (indicating a common service in the cooperating IP platform) as proposed in Table 3 is an element added in the service fragment, but its location should not be limited to a particular fragment.

TABLE 3

| Field | Semantics |
| --- | --- |
| CommonServiceInCooperationIPPlatform | If it is set to "true," the attribute specifies that the service is the common service in cooperating IP platform. If it is set to "false," the attribute specifies that the broadcast service is not the common service in cooperating IP platform. |

3.2 Identical ESG Fragment for the Common Broadcast Service in Cooperating IP Platform To support service continuity, all the information about the same service could be the same. Therefore, the fragment related to the same service in ESG1 and ESG2 is also the same.

In this case, if the terminal changes a reception path for the same broadcast service from the IP platform 1 to the IP platform 2, it does not need to newly access the ESG2 to receive the same broadcast service in the IP platform 2, but only needs to use the related information described in the ESG1. After the terminal parses an IP/MAC Notification Table (INT) table for the IP platform 2 from the ESG1 received from the IP platform 1, could the terminal may access the service from the IP platform 2.

3.2.1 New Signaling about IdenticalInformationForCommonServiceInCooperationIPPlatform Because the same broadcast services provided in the cooperating IP platforms have the same IP address, the terminal can find the same broadcast service in different cooperating IP platforms by checking the same IP address. However, the same broadcast service in different IP platforms may have different schedule, purchase, acquisition and other information in each related ESG. That is, even if the service contents are the same, the service description information, schedule, access server information, purchase server information, etc., may be different depending on the service provider. When this information is different, only the information in Table 3 of the invention is provided, and when all the information related to the services provided in the ESG is the same, information of Table 4 is provided.

More specifically, to indicate that the identical ESG fragment is used for same service in two cooperating IP platforms, additional signaling is needed as shown in Table 4. In this case, it should be set as "true." The information of Table 4 is delivered through the ESG.

The information in Table 3 indicates whether the current broadcast service is a common service or not in another IP platform. If the 'CommonServiceInCooperationIPPlatform' field of Table 3 is set as 'true', it means that the current broadcast service is the common service in the cooperating IP platforms.

The information in Table 4 below indicates whether the identical ESG fragment is used or not for such common broadcast service. If the 'IdenticalInformationForCommonServiceInCooperationIPPlatform' field in Table 4 is set as 'true', it means that the identical ESG fragment is used for the common broadcast service. If the field of Table 4 is set as 'false', it means that another ESG fragment is used for the common broadcast service.

Therefore, if the field of Table 3 is set to 'true', the field of Table 4 could be set as either 'true' or 'false'. However, if the field of Table 3 is set to 'false', the field of Table 4 is useless.

TABLE 4

| Field | Semantics |
| --- | --- |
| IdenticalInformationForCommonServiceInCooperationIPPlatform | If it is set to "true," the attribute specifies that the ESG fragment for the common service in cooperating IP platform is identical. If it is set to "false," the attribute specifies that the ESG fragment for the common service in cooperating IP platform is different. |

For example, it is assumed that one group of cooperating IP platforms has ten (10) IP platforms. If the identical ESG fragment for the common broadcast 10 service is used in every IP platform in this group, the signaling in Table 3 is sufficient. If the identical ESG fragment for the common broadcast service is used in only the IP platform 1 and the IP platform 2 in this group, then which IP platform is applied should be indicated as in Table 5. The information of Table 5 delivered through the ESG.

TABLE 5

| Field | Semantics |
| --- | --- |
| IdenticalInformationForCommonServiceInCooperationIPPlatform | If it is set to "true," the attribute specifies that the ESG fragment for the common service in cooperating IP platform is identical. If it is set to "false," the attribute specifies that the ESG fragment for the common service in cooperating IP platform is different. |
| Platform_id | Specifies the identifier of the IP platform that the identical ESG fragment for the common service is used. |

3.2.2 Definition of Location of the New Signaling about IdenticalInformationForCommonServiceInCooperationIPPlatform Field and Platform_Id Field in Table 5

The signaling locations about these fields may vary.

If an ESG fragment for all the common services described in one ESG is identical in all cooperating IP platforms, the IdenticalInformationForCommonServiceInCooperationIPPlatform field and the Platform_id field could be added in the bootstrap level for describing the attribute of this ESG, or ESG announcement carousel.

If the signaling as shown in Table 5 is used for each broadcast service, Table 5 could be put in the service fragment as a new element or descriptor.

Table 5 may also be added in PSI/SI, notification, etc.

3.3 Different ESG Fragment for the Common Broadcast Service in Cooperating IP Platforms The different ESG fragments for the common broadcast service, e.g., purchase fragment, schedule fragment, acquisition fragment, etc., in another cooperating IP platform could be also delivered in the current IP platform. Accordingly, the terminal has ESG information about the common broadcast service in cooperating IP platforms without accessing that IP platform.

The delivery of different ESG fragments for the common service for the other cooperating IP platforms in the current IP platform may be performed in variety of way. One possible method is described below.

Figure 7:
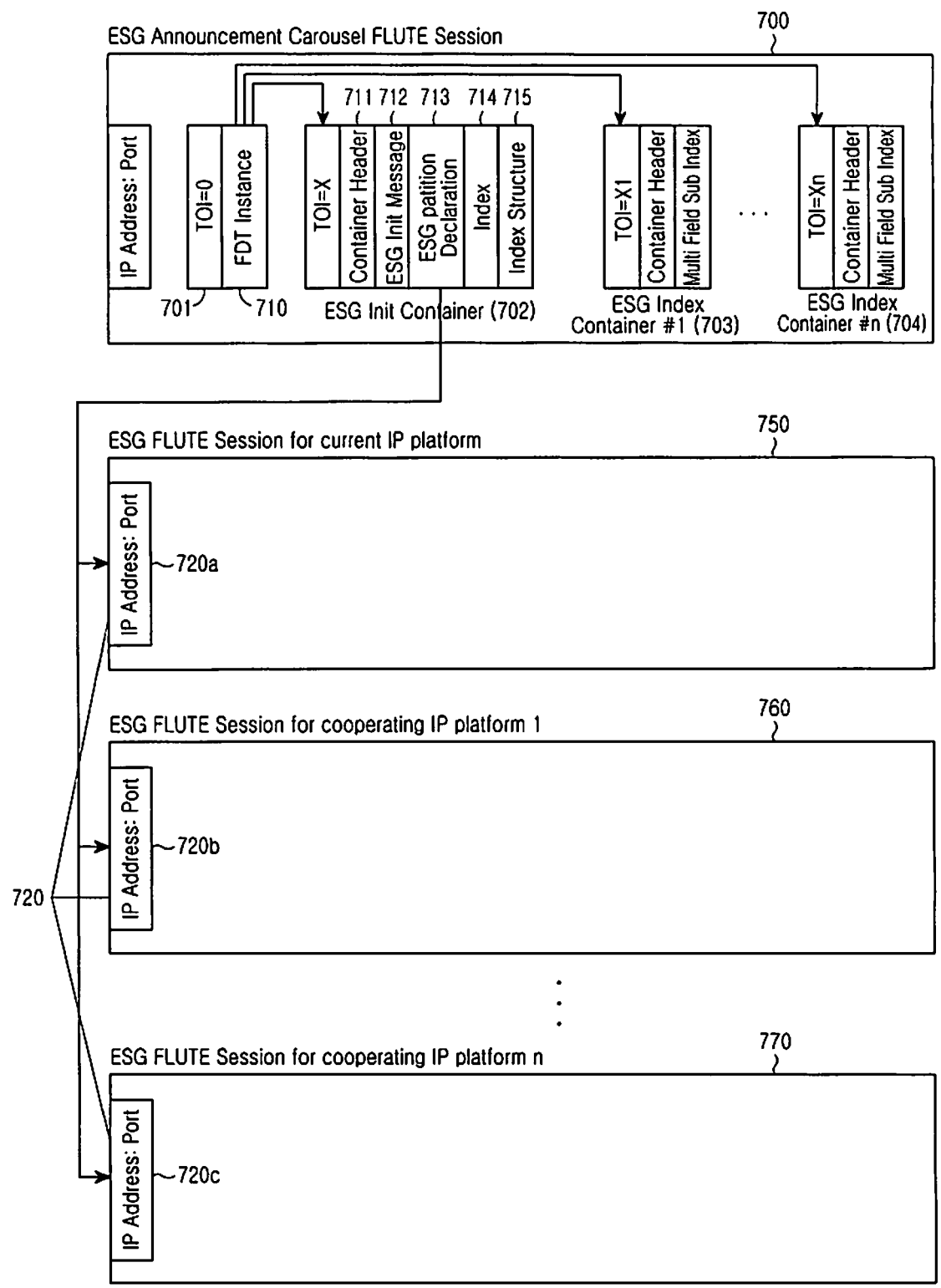
FIG. 7 illustrates different ESG FLUTE sessions for the current and cooperation IP platforms based on cooperating ESGs according to an embodiment of the present invention.

3.3.1 Different ESG File Delivery over Unidirectional Transport (FLUTE) Session for the Current and Cooperating IP Platforms FIG. 7 illustrates different ESG FLUTE sessions for the current and cooperation IP platforms based on cooperating ESGs according to an embodiment of the present invention.

As illustrated FIG. 7, different ESG FLUTE sessions may be used to transport the ESG fragment for the current IP platform, and the ESG fragment for the cooperating IP platforms (cooperating IP platform 1 and cooperating IP platform 2) that can provide the same broadcast service as that of the current IP platform. An ESG announcement carousel FLUTE session 700 includes a File Delivery Table (FDT) instance 701, an ESG Initiation (Init) Container 702, and ESG Index Containers 703 to 704.

A first FLUTE session 750 is used for delivering an ESG fragment in the current IP platform, and other FLUTE sessions 760 to 770 are used for the common service-related fragments in the other IP platforms (cooperating IP platform 1 and cooperating IP platform n).

TOI in FIG. 7 indicates a Transport Object Identifier in Layered Coding Transport (LCT). The ESG Init Container 702 includes a Container Header 711, an ESG Init Message 712, an ESG Partition Declaration 713, an Index 714, and an Index Structure 715. The Container Header 711 describes a structure type and an id in the container.

The ESG Init Message 712 initializes reception of the ESG. For this purpose, a representation of the ESG, an index, and a presence of decoder Init are signaled.

The Index Structure 715 announces a set of indexes available in the ESG stream. The Index Structure 715 declares global settings for the index, or declares a range of values discoverable within given sub-indexes and a set of sub-indexes constituting the index. The ESG Partition Declaration 713 particularly describes a partitioning strategy, and informs the terminal how the ESG is partitioned and what partitioning criteria is used in every session.

New partitioning mechanisms may be provided to distinguish the different ESG fragments for different IP platforms as in Table 6.

Referring to FIG. 7, an ESG may be divided into a plurality of FLUTE sessions according to partitioning mechanism. When '0x00' in Table 6 is used as a partitioning rule, it indicates that each FLUTE session of the ESG is partitioned and delivered according to the time for which services included in the ESG are provided. Reference numeral 750 indicates a FLUTE session for the current IP platform, reference numeral 760 indicates a FLUTE session for the cooperating IP platform 1, and reference numeral 770 indicates a FLUTE session for the cooperating IP platform n.

If 'n' is '2', the ESG will be partitioned into FLUTE sessions for 3 IP platforms and then delivered through them. That is, an ESG including the services to be provided for the next 24 hours is partitioned into three parts: 0-8 o'clock, 9-16 o'clock and 17-24 o'clock, and then delivered through the FLUTE sessions 750, 760 and 770, respectively. Thus, in accordance with an embodiment of the present invention a rule for partitioning the FLUTE sessions according to IP platforms is added.

TABLE 6

| Value | Encoding | Meaning |
|---|---|---|
| 0x00 | 0x0101 (unsigned short integer) | The number of hours for which the fragments are valid. This may be used to split the ESG into various schedule depths. |
| 0x01 | 0x0000 (string) | The URI of the Service fragments ServiceID. This may be used to carry all fragments relevant to a particular service. |
| 0xA0 | 0x0101 (positive Integer) | Platform id |

The ESG Partition Declaration 713 includes a field identifier indicating which partition criteria is used, and a start_field_value and an end_field_value for each FLUTE session, which represent a range value for an IP address about each FLUTE session. If there are no range values overlapping between FLUTE sessions, the end_field_value will be omitted.

When a new criterion for the "platform id" is used, the field identifier is set as 0XA0 in the ESG Partition Declaration 713. In FIG. 7, the first FLUTE session 750 is for the current IP platform, and a start_field_value of this session is set as a platform id of the current IP platform. An end_field_value may be omitted. The second FLUTE session 760 is for a cooperating IP platform 1 cooperating with the current IP platform, and a start_field_value of this session is set as a platform id of the cooperating IP platform 1. The $n^{th}$ FLUTE session 770 is for a cooperating IP platform n cooperating with the current IP platform, and its start_field_value is set as a platform id of the cooperating IP platform n.

In FIG. 7 illustrates an IP address where each FLUTE session begins is assigned on a platform-by-platform basis through the ESG Partition Declaration 713 as indicated by reference numeral 720. An IP address 720a of the ESG FLUTE session for the current IP platform as indicated by reference numeral 750, an IP address 720b of the FLUTE session for the cooperating IP platform 1, and an IP address 720c of the FLUTE session for the cooperating IP platform n are entry points of the respective FLUTE sessions.

3.3.2 Different ESG Entry Points for the Current and Cooperating IP Platforms

Figure 8:
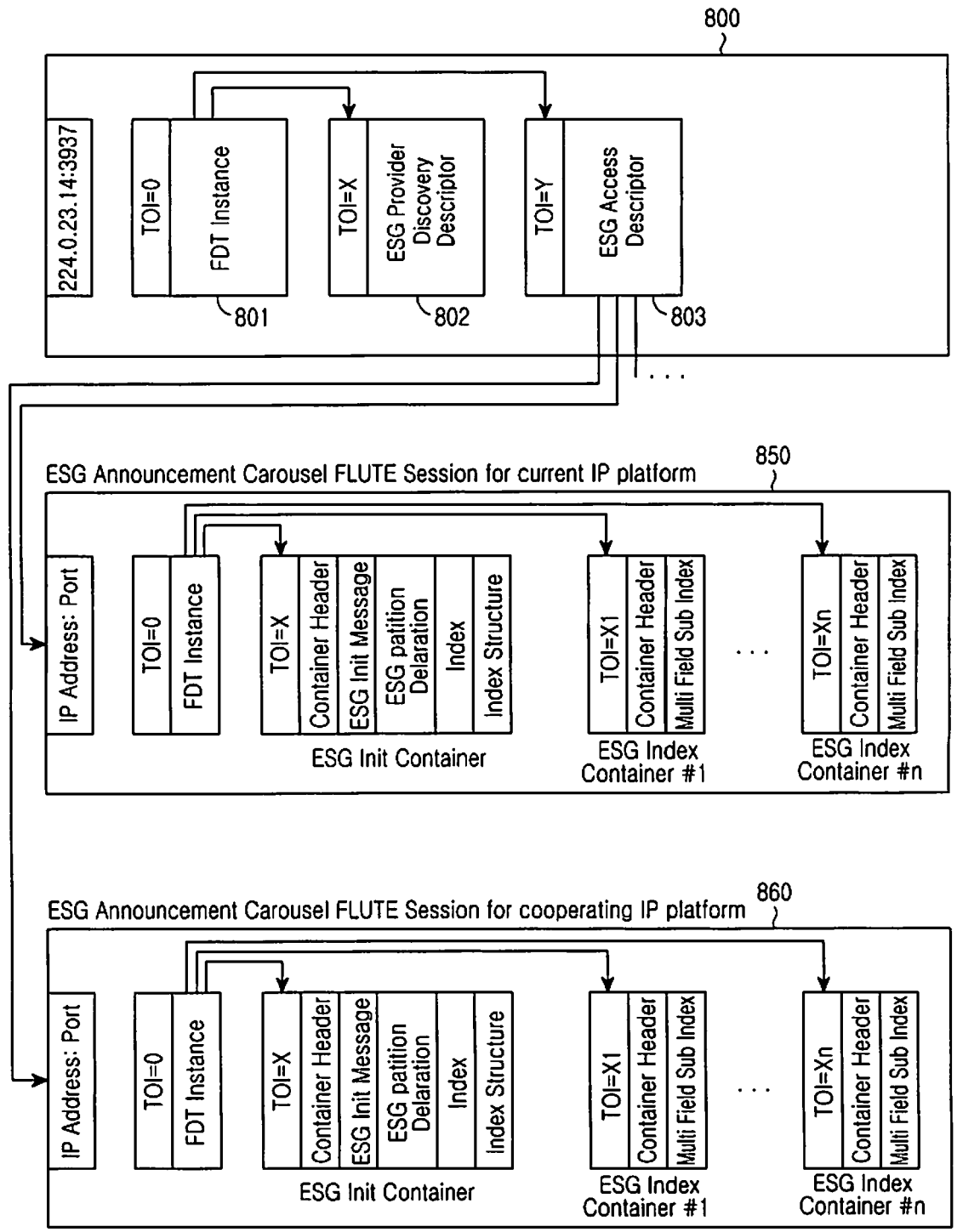
FIG. 8 illustrates possible assignment of different entry points for the ESG fragment in the current IP platform and the common service-related ESG fragment in a cooperating IP platform based on cooperating ESGs according to an embodiment of the present invention.

FIG. 8 illustrates possible assignment of different entry points for the ESG fragment in the current IP platform and the common service-related ESG fragment in a cooperating IP platform based on cooperating ESGs according to an embodiment of the present invention. Reference numeral 850 in FIG. 8 identifies an ESG Announcement Carousel FLUTE Session for the current IP platform, and reference numeral 860 shows an ESG Announcement Carousel FLUTE Session for a cooperating IP platform.

An ESG Bootstrap 800 includes an FDT Instance 801, an ESG Provider Discovery Descriptor 802, and an ESG Access Descriptor 803. The descriptors provide the information for acquisition of the ESG Provider and available ESGs. Referring to FIG. 8, the ESG Provider defines an ESG provider that delivers an ESG in a given IP platform. The ESG Access Descriptor 803 is a binary number indicating ESG acquisition information.

In FIG. 8, one ESG has one or more entry points. One entry point carries an ESG announcement carousel FLUTE session 850 for the current IP platform. This entry point is indicated using a platform id of the current IP platform.

Another entry point carries an ESG announcement carousel FLUTE session 860 for an IP platform cooperating with the current IP platform. This entry point is indicated using a platform id of the cooperating IP platform.

This new element "Platform id" may be added in the ESG Access Descriptor 803 in various ways. The "Platform id" in Table 7 or Table 8 indicates for which IP platform the entry points are to be used. However, this is a mere example, and for a detailed description of the other elements, reference could be made to ETSI TS 102 471. Tables 7 and 8 below show the insertion of the Platform id into the ESG Entry or ESG Access Descriptor according to an embodiment of the present invention.

In an embodiment of the present invention, an entry point of an IP platform corresponding to the Platform id may be carried in the ESG Entry of Table 7 or the ESG Access Descriptor of Table 8.

The Platform id could be added in various locations in the ESG Access Descriptor. Table 7 shows one possible location, and Table 8 shows alternative possible locations.

TABLE 7

| Syntax |
|---|
| ESGEntry {<br>  ESGEntryVersion<br>  ESGEntryLength<br>  MultipleStreamTransport<br>  IPVersion6<br>  Reserved<br>  ProviderID<br>  if(IPVersion6) {<br>    SourceIPAddress<br>    DestinationIPAddress<br>  }else{<br>    SourceIPAddress<br>    DestinationIPAddress<br>  }<br>  Port<br>  TSI<br>  Platform id<br>} |

TABLE 8

| Syntax |
|---|
| ESG Access Descriptor {<br>  n_o_ESGEntries<br>  for(i=0; i<n_o_ESGEntries; i++) {<br>    ESGEntry[i]( )<br>    Platform id<br>  }<br>} |

3.3.3 Different ESGs for the Current and Cooperating IP Platforms

If the different ESGs for the common broadcast service in cooperating IP platforms are delivered in the current IP platform, the signaling of IP platform identifier for each ESG is included in the bootstrap level as shown in Table 9 below. The location may be in the existing ESGProviderDiscoveryDescriptor and ESGAccessDescriptor, or new descriptors.

TABLE 9

| Field | Semantics |
|---|---|
| ESGURI | Specifies the ESG identifier |
| Platform id | Specifies the platform identifier that is associated to the ESG |

Figure 9A:
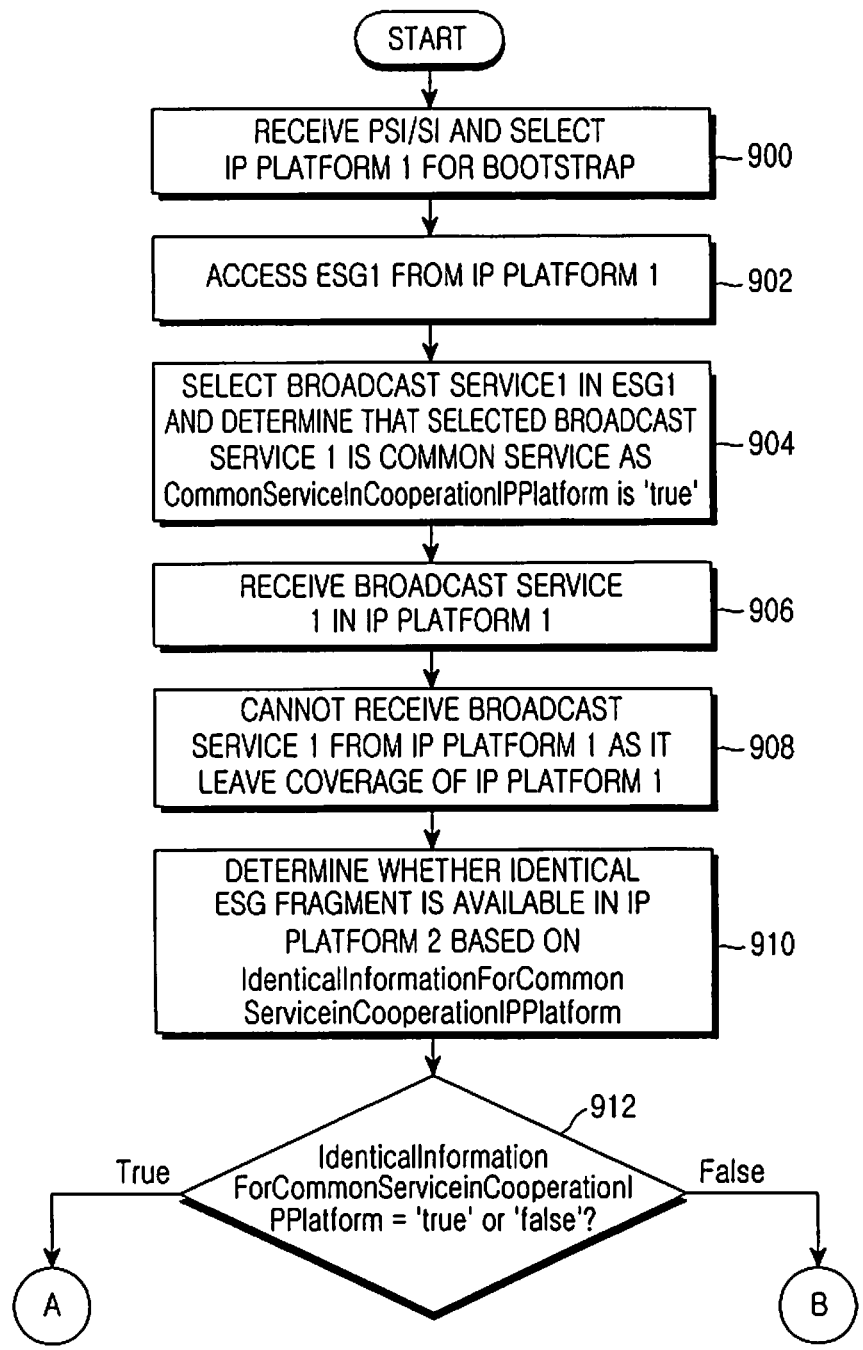
FIGS. 9A and 9B illustrate an operation of a terminal according to an embodiment of the present invention.
Figure 9B:
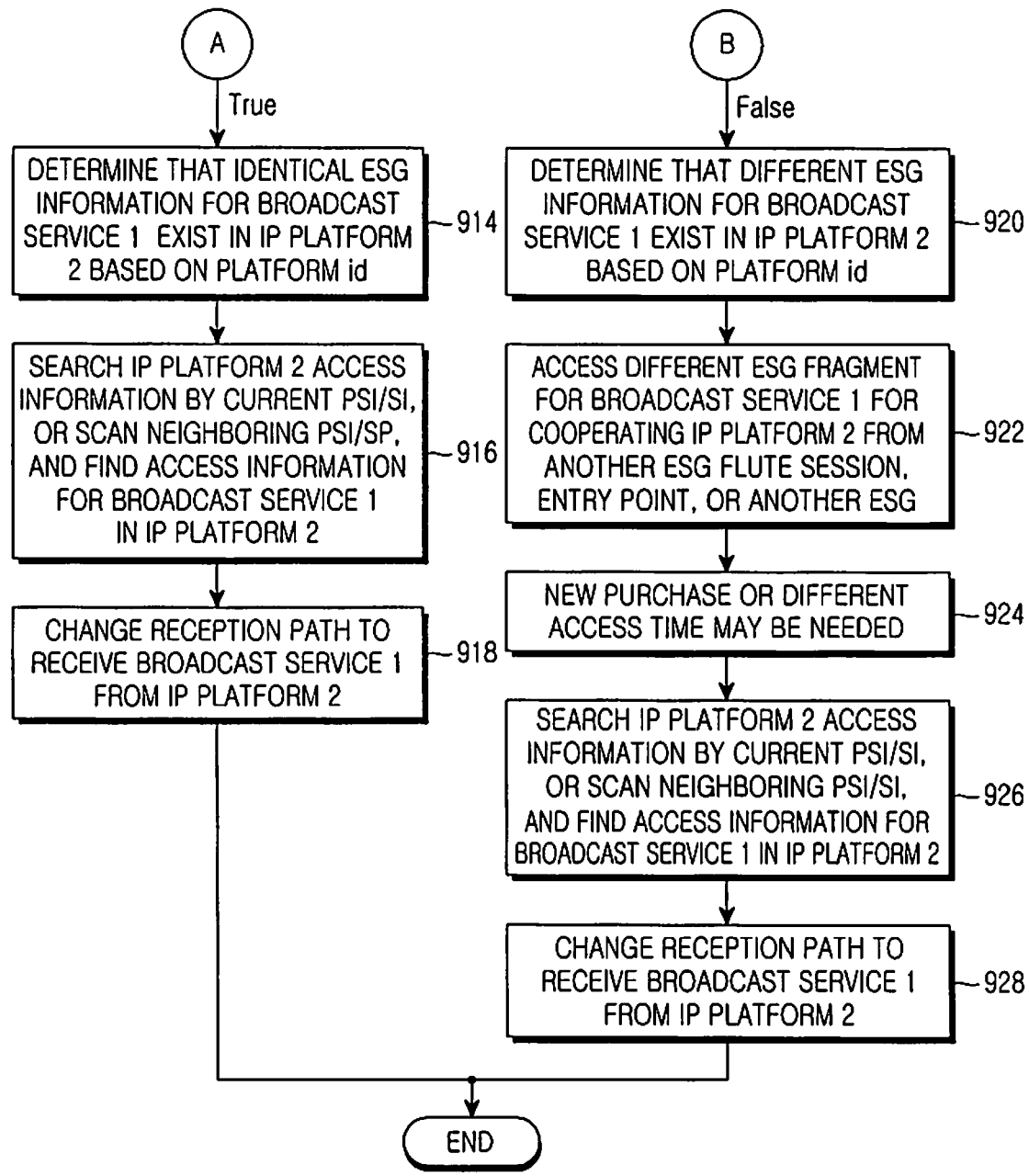

FIGS. 9A and 9B illustrate an operation of a terminal according to an embodiment of the present invention.

In step 900, the terminal receives PSI/SI and selects an IP platform 1 for a bootstrap. In step 902, the terminal accesses an ESG 1 from the IP platform 1.

In step 904, the terminal selects a broadcast service 1 in the ESG1, and determines if a CommonServiceInCooperationIPPlatform field is set as "true" in the received ESG1. If the CommonServiceInCooperationIPPlatform field is set as "true," the terminal determines that the broadcast service 1 is a common service. In step 906, the terminal receives the broadcast service 1 in the IP platform 1.

However, in step 908, the terminal could not receive the broadcast service from the IP platform 1 for several reasons, such as a reason for leaving the coverage of the IP platform 1 as it moves to an IP platform 2. Because, however, it is determined in step 904 that the CommonServiceInCooperationIPPlatform field is set as "true," the terminal could know the IP platform 2 is an IP platform cooperating with the IP platform 1 based on the Platform id as shown in Table 5, knowing that the broadcast service 1 is the common service in the cooperating IP platforms.

In step 910, the terminal may identify whether the same information as the information needed to receive the broadcast service 1 is available in the IP platform 2 cooperating with the IP platform 1, by checking a value of an IdenticalInformationForCommonServiceInCooperationIPPlatform field included in the ESG1 from the IP platform 1. The IdenticalInformationForCommonServiceInCooperationIPPlatform field is included in the ESG1 received from the IP platform 1.

If the IdenticalInformationForCommonServiceInCooperationIPPlatform field value is set as "true" in step 912, the terminal determines in step 914 that the identical ESG information as the ESG information for the broadcast service 1 exists in the IP platform 2 cooperating with the IP platform 1. In step 916, the terminal searches access information of the IP platform 2 in the current PSI/SI received from the IP platform 1 or scans neighboring signaling, and searches access information for the broadcast service 1 provided in the IP platform 2. Thereafter, in step 918, the terminal changes its broadcast service reception path by performing a handover from the IP platform 1 to the IP platform 2, and accesses the broadcast service 1 provided from the IP platform 2 to receive the same broadcast service as the broadcast service that was provided from the IP platform 1.

However, if it is determined in step 912 that the IdenticalInfornationForCommonServiceInCooperationIPPlatform field's value is set as "false," the terminal determines in step 920 that the ESG information for the broadcast service 1 existing in the IP platform 2 is different from the ESG information for the broadcast service 1 that was provided in the IP platform 1. In step 922, the terminal collects ESG fragments different from those of the IP platform 1 for the broadcast service 1 in the IP platform 2 cooperating with the IP platform 1, from another ESG FLUTE session, entry point and even another ESG. In step 924, the terminal may need different purchase or access schedule from that of the IP platform 1, when it accesses the IP platform 2 to receive the broadcast service. Thereafter, in step 926, the terminal searches access information of the IP platform 2 in the PSI/SI currently received from the IP platform 2 or scans neighboring signaling, and searches access information for the broadcast service 1 provided in the IP platform 2. In step 928, the terminal changes its reception path to receive the broadcast service 1 provided from the IP platform 2.

Figure 10:
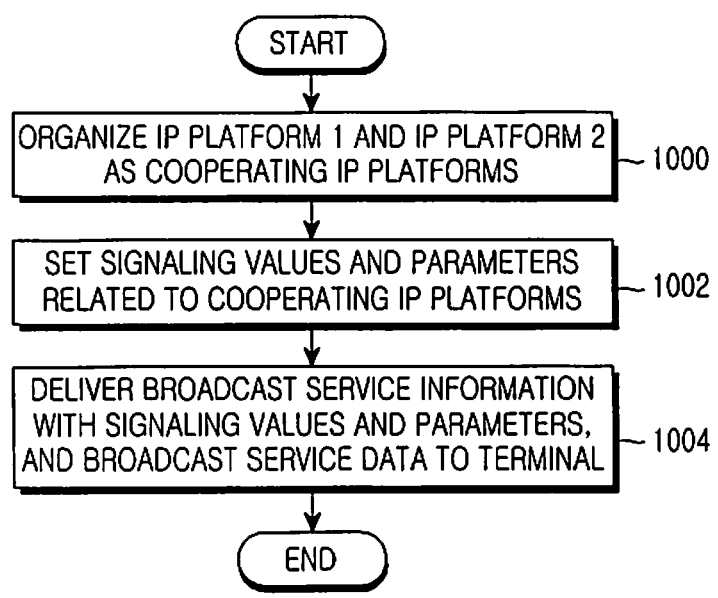
FIG. 10 illustrates an operation of a service provider in a broadcasting system according to an embodiment of the present invention.

FIG. 10 illustrates an operation of a service provider in a broadcasting system according to an embodiment of the present invention.

Referring to FIG. 10, in step 1000, the service provider organizes or designates an IP platform 1 and an IP platform 2 as cooperating IP platforms. In step 1002, the service provider will set related signaling values and parameter values, which are shown above in Tables 1 to 9, to support the cooperating IP platforms. In step 1004, the service provider delivers a broadcast service to a terminal together with the signaling values and parameters as in Table 1 to Table 9. The service provider may also send the terminal a list of IP platforms having the common IP address range and an indicator indicating presence of the common IP address range in step 1004.

Above, the description has been made of the parameter values and signaling values proposed by the present invention in accordance with Tables 1 to 9 to receive the common broadcast service. In the following description, the parameter values and signaling values proposed using Tables 1 to 9 will be referred to as related information relevant to the common broadcast service.

Figure 11:
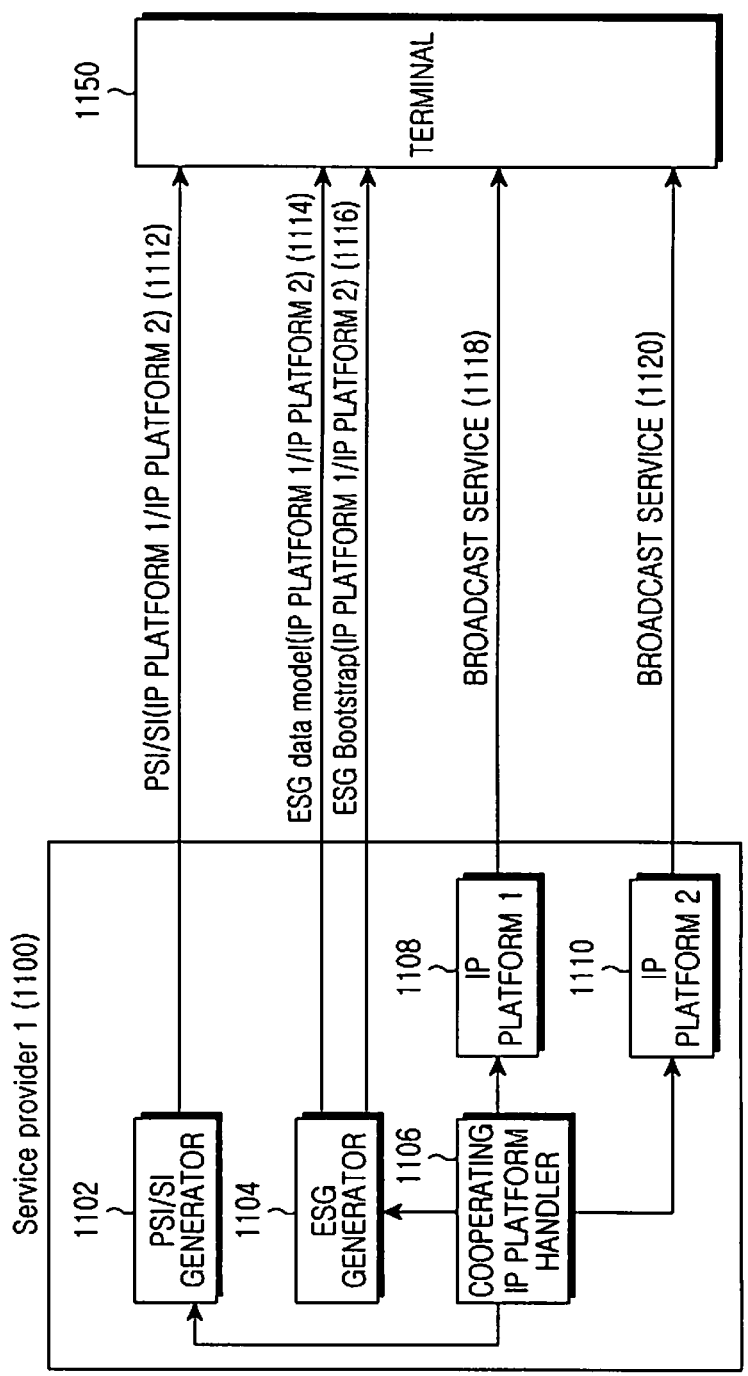
FIG. 11 illustrates architecture of a digital broadcasting system according to an embodiment of the present invention.

FIG. 11 illustrates architecture of a digital broadcasting system according to an embodiment of the present invention. The digital broadcasting system includes a service provider 1100 and a terminal 1150. The service provider 1100 in FIG. 11, which serves as a broadcast server, provides a broadcast service and information related to the broadcast service to the terminal 1150.

A PSI/SI generator 1102 generates PSI/SI for the terminal 1150 to receive a broadcast service. In accordance with an embodiment of the present invention, the PSI/SI generator 1102 generates PSI/SI 1112 and sends it to the terminal 1150. A value No_IPPlatform for indicating a number assigned in common to cooperating IP platforms among IP platforms, an identifier Platform_id for identifying each cooperating IP platform, and values Start_IPAddress and End_IPAddress indicating an IP address range for a broadcast service provided in common in the cooperating IP platform are inserted into the PSI/SI 1112. Because an IP platform 1 and an IP platform 2 are organized herein as cooperating IP platforms, the PSI/SI generator 1102 generates PSI/SI information for the IP platform 1 and the IP platform 2 and sends it to the terminal 1150.

An ESG generator 1104 generates an ESG for the terminal 1150 to receive a broadcast service. In accordance with an embodiment of the present invention, the ESG generator 1104 generates an ESG and sends it to the terminal 1150 through an ESG data model 1114 or an ESG bootstrap 1116. A value No_IPPlatform for indicating a number assigned in common to a bundle of the cooperating IP platforms among IP platforms, an identifier Platform_id for identifying each cooperating IP platform, and values Start_IPAddress and End_IPAddress indicating an IP address range for a broadcast service provided in common in the cooperating IP platforms are inserted into the ESG. Accordingly, the ESG generator 1104 generates an ESG including the values shown in Tables 3 to 9, and sends it to the terminal 1150 through the ESG data model 1114 or the ESG bootstrap 1116.

An IP platform_1 1108 and an IP platform_2 1110 provide IP-based broadcast services 1118 and 1120 to the terminal 1150, respectively. The broadcast services 1118 and 1120 may include a common service.

A cooperating IP platform handler 1106 organizes specific IP platforms (the IP platform_1 1108 and the IP platform_2 1110 in FIG. 11) as cooperating IP platforms, and provides related information relevant to the common broadcast service provided in the cooperating IP platforms (IP platform 1 and IP platform 2) to a related information transmitter that includes the PSI/SI generator 1102 and the ESG generator 1104. The term "related information" as used herein refers to information about a cooperation between the IP platform_1 1108 and the IP platform_2 1110 paired as cooperating IP platforms. For example, the cooperating IP platform handler 1106 generates the information shown in Tables 1 to 9, and provides it to the PSI/SI generator 1102 and the ESG generator 1104. In addition, the cooperating IP platform handler 1106 delivers broadcast services provided from a content provider to the associated IP platforms 1108 and 1110.

In accordance with an embodiment of the present invention, when there is a common broadcast service being provided in common in the cooperating IP platforms, the cooperating IP platform handler 1106 assigns the same IP address for the common broadcast service, generates related information relevant to the common broadcast service, and provides the related information to the PSI/SI generator 1102 and the ESG generator 1104. Then the PSI/SI generator 1102 transmits the related information to the terminal 1150 together with the PSI/SI 1112, and the ESG generator 1104 transmits the related information to the terminal 1150 through the ESG data model 1114 and the ESG bootstrap 1116.

The terminal 1150 acquires the related information needed to receive the broadcast services 1118 and 1120, from the received PSI/SI or ESG, and receives the broadcast services 1118 and 1120 from the IP platforms 1108 and 1110 using the acquired related information, respectively.

After acquiring the related information including information about the cooperating IP platforms in this manner, the terminal 1150 determines the common broadcast service being provided in common in the IP platforms, and receives broadcast data regarding the common broadcast service while maintaining service continuity, in the process of performing a handover between the paired cooperating IP platforms. In addition, during the handover between the paired cooperating IP platforms, the terminal 1150 may also receive the common ESG service fragments for the common broadcast service in the cooperating IP platforms while maintaining continuity.

As described above, the terminal 1150 receives related information relevant to a common broadcast service being provided in common in at least two cooperating IP platforms, from one of the cooperating IP platforms, and determines if the currently received broadcast service is the common broadcast service, based on the related information. When the current broadcast service is the common broadcast service, the terminal 1150 continues to receive the common broadcast service from the remaining IP platform, except for the one IP platform.

Figure 12:
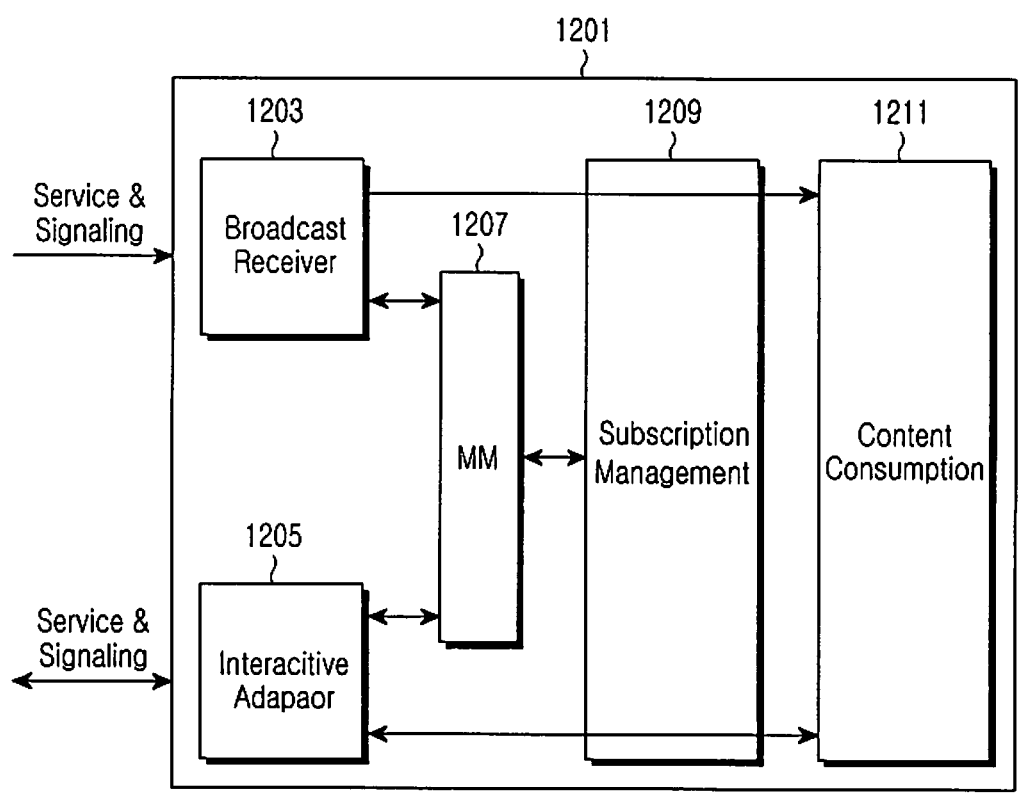
FIG. 12 illustrates a structure of a terminal according to an embodiment of the present invention.

FIG. 12 illustrates a structure of a terminal 1201 according to an embodiment of the present invention.

Referring to FIG. 12, a broadcast receiver 1203 receives a broadcast service or signaling over a broadcast network. An interactive adaptor 1205 receives a broadcast service or exchanges signaling over an interactive network such as a mobile communication network. A subscription management block 1209 manages right acquisition, tracks the rights acquired for the terminal 1201, and controls decoding and decryption on a received broadcast service. A content consumption block 1211 provides the broadcast contents decoded and decrypted by the subscription management block 1209 to the user.

In the network illustrated in FIG. 11, the related information defined in the present invention to support the cooperating IP platforms may be carried in the PSI/SI 1112, the ESG data model 1114 and the ESG bootstrap 1116.

In the terminal 1201, the PSI/SI 1112 is received by the broadcast receiver 1203. The ESG bootstrap 1116 and the ESG data model 1114 are received by the broadcast receiver 1203 and the interactive adaptor 1205, which constitute a reception unit.

Based on the PSI/SI 1112 received by the broadcast receiver 1203, the broadcast services from the two IP platforms 1118 and 1120 are received by the broadcast receiver 1203 and the interactive adaptor 1205. That is, the related information relevant to the common broadcast service being provided in common in the cooperating IP platforms and the common broadcast service are received by the reception unit.

A Mobility Management (MM) block 1207 may determine the IP platforms that cooperate with each other or provide the same broadcast service, based on the PSI/SI or ESG received through the reception unit. The MM block 1207 determines if the currently received broadcast service is a common broadcast service based on the related information received through the reception unit. If the current broadcast service is the common broadcast service, the MM block 1207 acquires information needed to receive the common broadcast service from the related information, and controls the reception unit to continuously receive the broadcast service from the remaining IP platform, except for the current IP platform.

Based on this information, the terminal 1150 (1201) can continuously provide the common broadcast service to the user, and the user can determine whether to continuously receive the common broadcast service.

As is apparent from the foregoing description, according to the above-described embodiments of the present invention, the digital broadcasting system provides broadcast service data to a mobile terminal that has moved to another IP platform, while maintaining service continuity.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for sending a broadcast service in a digital broadcasting system, comprising:
assigning, by a cooperating Internet Protocol (IP) platform handler, a same IP address for a common broadcast service when the common broadcast service is provided in at least two cooperating IP platforms each providing a broadcast service to a terminal;
delivering the common broadcast service using the same IP address; and
delivering related information relevant to the common broadcast service,
wherein the related information includes information for indicating whether the common broadcast service exists in the at least two cooperating IP platforms, a common number of the at least two cooperating IP platforms, an identifier of each of the at least two cooperating IP platforms, and information indicating whether an Electronic Service Guide (ESG) fragment for the common broadcast service is identical in the at least two cooperating IP platforms.

2. The method of claim 1, wherein the related information includes a platform identifier including a first part comprising the common number having a same value in one group of cooperating IP platforms, which includes the at least two cooperating IP platforms, and a second part having the identifier for identifying each of the at least two cooperating IP platforms included in the one group of cooperating IP platforms.

3. The method of claim 1, wherein assigning the same IP address for the common broadcast service comprises assigning the same IP address within an IP address range assigned for common broadcast services in an IP address range assigned to each of the at least two cooperating IP platforms providing the common broadcast service.

4. The method of claim 1, wherein the related information is delivered through at least one of a notification, Program Specific Information/Service Information (PSI/SI), and an ESG.

5. The method of claim 1, wherein an IP address range for each of the at least two cooperating IP platforms includes a common IP address range for the common broadcast service, and an IP address range for a non-common broadcast service.

6. The method of claim 5, wherein the related information includes a start IP address Start_IPAddress of the common IP address range and an end IP address End_IPAddress of the common IP address range.

7. The method of claim 1, wherein the related information further includes an identifier of an IP platform in which the identical ESG fragment for the common broadcast service is used among the at least two cooperating IP platforms.

8. An apparatus for sending a broadcast service in a digital broadcasting Currently Amended a cooperating Internet Protocol (IP) platform handler for assigning a same IP address for a common broadcast service, when the common broadcast service is provided in at least two cooperating IP platforms, each of the at least two cooperating IP platforms providing a broadcast service to a terminal, and for generating related information relevant to the common broadcast service;

a related information transmitter for transmitting the related information received from the cooperating IP platform handler to the terminal; and the at least two cooperating IP platforms for delivering the common broadcast service to the terminal using the same IP address, wherein the related information includes information for indicating whether the common broadcast service exists in the at least two cooperating IP platforms, a common number of the at least two cooperating IP platforms, an identifier of each of the at least two cooperating IP platforms, and information indicating whether an Electronic Service Guide (ESG) fragment for the common broadcast service is identical in the at least two cooperating IP platforms.

9. The apparatus of claim 8, wherein the related information comprises a platform identifier including a first part comprising the common number having a same value in one group of cooperating IP platforms, which includes the at least two cooperating IP platforms, and a second part having the identifier for identifying each of the at least two cooperating IP platforms included in the one group of cooperating IP platforms.

10. The apparatus of claim 8, wherein the same IP address is assigned within an IP address range assigned for common broadcast services in an IP address range assigned to each of the at least two cooperating IP platforms providing the common broadcast service.

11. The apparatus of claim 8, wherein the related information is delivered through at least one of a notification, Program Specific Information/Service Information (PSI/SI), and an ESG.

12. The apparatus of claim 8, wherein an IP address range for each of the at least two cooperating IP platforms comprises:

a common IP address range for the common broadcast service; and an IP address range for a non-common broadcast service.

13. The apparatus of claim 12, wherein the related information comprises:

a start IP address Start_IPAddress of the common IP address range; and an end IP address End_IPAddress of the common IP address range.

14. The apparatus of claim 8, wherein the related information further comprises:

an identifier of an IP platform in which the identical ESG fragment for the common broadcast service is used among the at least two cooperating IP platforms.

* * * * *